United States Patent
Yang et al.

(10) Patent No.: US 11,829,009 B2
(45) Date of Patent: Nov. 28, 2023

(54) DISPLAY MODULE AND ASSEMBLY METHOD THEREFOR, AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Haotian Yang, Beijing (CN); Fuzheng Xie, Beijing (CN); Xiaoxia Liu, Beijing (CN); Kang Wang, Beijing (CN); Junhui Yang, Beijing (CN); Jiaxiang Zhang, Beijing (CN); Yiming Wang, Beijing (CN); Zhenhua Zhang, Beijing (CN); Renzhe Xu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/014,230

(22) PCT Filed: Oct. 13, 2021

(86) PCT No.: PCT/CN2021/123637
§ 371 (c)(1),
(2) Date: Jan. 3, 2023

(87) PCT Pub. No.: WO2022/095670
PCT Pub. Date: May 12, 2022

(65) Prior Publication Data
US 2023/0273473 A1 Aug. 31, 2023

(30) Foreign Application Priority Data
Nov. 9, 2020 (CN) .......................... 202022585390.7

(51) Int. Cl.
*G02F 1/1333* (2006.01)
*G02F 1/1335* (2006.01)
(Continued)

(52) U.S. Cl.
CPC .... *G02F 1/133388* (2021.01); *G02F 1/13338* (2013.01); *G02F 1/133354* (2021.01);
(Continued)

(58) Field of Classification Search
None
See application file for complete search history.

(56) References Cited

U.S. PATENT DOCUMENTS

2006/0125981 A1 6/2006 Okuda
2013/0201639 A1 8/2013 Ryu et al.
(Continued)

FOREIGN PATENT DOCUMENTS

CN 103839923 A 6/2014
CN 104866151 A 8/2015
(Continued)

OTHER PUBLICATIONS

International Search Report and Written Opinion (with English translation) for Application No. PCT/CN2021/123637, dated Jan. 19, 2022, 18 pages.

*Primary Examiner* — Krishna P Neupane
(74) *Attorney, Agent, or Firm* — Dority & Manning, PA

(57) ABSTRACT

A display module includes a display panel, a first optical adhesive layer disposed on a side of a display surface of the display panel, a touch panel disposed on a side of the first optical adhesive layer away from the display panel, and at least one isolation film between the display panel and the touch panel. The display panel includes a display region and a peripheral region that is provided with at least one alignment mark. The touch panel includes a plurality of periph-
(Continued)

eral signal lines. An orthographic projection of the peripheral signal lines on a plane where the display panel is located at least partially overlaps with an orthographic projection of the at least one alignment mark on the plane. An orthographic projection of each isolation film on the plane covers an alignment mark.

20 Claims, 13 Drawing Sheets

(51) Int. Cl.
   *G02F 1/1345* (2006.01)
   *G06F 3/041* (2006.01)

(52) U.S. Cl.
   CPC .... *G02F 1/133512* (2013.01); *G02F 1/13452* (2013.01); *G02F 1/133305* (2013.01); *G02F 1/133331* (2021.01); *G02F 1/133541* (2021.01); *G02F 2202/28* (2013.01); *G06F 3/0412* (2013.01); *G06F 2203/04102* (2013.01); *G06F 2203/04103* (2013.01)

(56) References Cited

U.S. PATENT DOCUMENTS

| | | | |
|---|---|---|---|
| 2013/0222719 A1* | 8/2013 | Matsumoto | H04N 13/31 349/15 |
| 2016/0093684 A1* | 3/2016 | Youk | H10K 59/88 257/40 |
| 2018/0059862 A1 | 3/2018 | Zeng et al. | |
| 2018/0210576 A1 | 7/2018 | Zhang et al. | |
| 2019/0324315 A1 | 10/2019 | Ohashi et al. | |
| 2020/0035762 A1* | 1/2020 | Kim | H10K 59/124 |
| 2021/0200352 A1 | 7/2021 | Wang et al. | |

FOREIGN PATENT DOCUMENTS

| | | |
|---|---|---|
| CN | 105044942 A | 11/2015 |
| CN | 105182697 A | 12/2015 |
| CN | 106711074 A | 5/2017 |
| CN | 109581833 A | 4/2019 |
| CN | 109633956 A | 4/2019 |
| CN | 110018586 A | 7/2019 |
| CN | 110105882 A | 8/2019 |
| CN | 110211502 A | 9/2019 |
| CN | 111708206 A | 9/2020 |
| CN | 214335688 U | 10/2021 |

\* cited by examiner

DISPLAY MODULE AND ASSEMBLY METHOD THEREFOR, AND DISPLAY APPARATUS

CROSS-REFERENCE TO RELATED APPLICATIONS

This application is a national phase entry under 35 USC 371 of International Patent Application No. PCT/CN2021/123637, filed on Oct. 13, 2021, which claims priority to Chinese Patent Application No. 202022585390.7, filed on Nov. 9, 2020, which are incorporated herein by reference in their entirety.

TECHNICAL FIELD

The present disclosure relates to the field of display technologies, and in particular, to a display module and an assembly method therefor, and a display apparatus.

BACKGROUND

Nowadays, touch display apparatuses are more and more widely used, and in particular, narrow-bezel active-matrix organic light-emitting diode (AMOLED) touch display apparatuses have become one of the trends in the field of display technologies.

SUMMARY

In an aspect, a display module is provided. The display module includes a display panel, a first optical adhesive layer, a touch panel and at least one isolation film. The display panel has a display region and a peripheral region, and includes at least one alignment mark in the peripheral region. The first optical adhesive layer is disposed on a side of a display surface of the display panel. The touch panel is disposed on a side of the first optical adhesive layer facing away from the display panel, and the touch panel includes a plurality of peripheral signal lines. An orthographic projection of the plurality of peripheral signal lines on a plane where the display panel is located at least partially overlaps with an orthographic projection of the at least one alignment mark on the plane where the display panel is located. The at least one isolation film is disposed between the display panel and the touch panel, and an orthographic projection of each isolation film on the plane where the display panel is located covers an alignment mark. The isolation film is configured to block light directed to the plurality of peripheral signal lines from a side of the display panel away from the touch panel.

In some embodiments, the peripheral region includes a first peripheral region surrounding the display region, and a second peripheral region located on a side of the first peripheral region away from the display region. The at least one alignment mark includes at least one first alignment mark disposed in the first peripheral region. The orthographic projection of the plurality of peripheral signal lines on the plane where the display panel is located at least partially overlaps with an orthographic projection of the first alignment mark on the plane where the display panel is located. The orthographic projection of each isolation film on the plane where the display panel is located covers a first alignment mark.

In some embodiments, the at least one isolation film is disposed on a side of the first optical adhesive layer proximate to the display panel. Alternatively, the at least one isolation film is disposed on a side of the first optical adhesive layer proximate to the touch panel.

In some embodiments, a surface of the isolation film away from the first optical adhesive layer has adhesion. A surface of the isolation film proximate to the first optical adhesive layer has no adhesion, and the isolation film is bonded to the first optical adhesive layer through adhesion of the first optical adhesive layer.

In some embodiments, the first optical adhesive layer includes a first surface on which the isolation film is disposed, and a second surface opposite to the first surface. A portion of the first surface not covered by the isolation film is substantially flush with a surface of the isolation film away from the second surface.

In some embodiments, a ratio of a thickness of a portion of the first optical adhesive layer not covered by the isolation film to a thickness of the isolation film is in a range of 10 to 30, inclusive.

In some embodiments, the thickness of the portion of the first optical adhesive layer not covered by the isolation film is in a range of 100 μm to 150 μm, inclusive. The thickness of the isolation film is in a range of 5 μm to 10 μm, inclusive.

In some embodiments, in a plurality of side edges of the first optical adhesive layer, a side edge corresponding to the second peripheral region has at least one lug. An orthographic projection of each first alignment mark on the first optical adhesive layer is within a range of a lug. Each isolation film is disposed on a lug.

In some embodiments, a ratio of a dimension of the isolation film in a first direction to a dimension of the corresponding lug in the first direction is in a range of 0.5 to 1, inclusive. The first direction is parallel to an extending direction of the side edge of the first optical adhesive layer corresponding to the second peripheral region.

In some embodiments, the dimension of the isolation film in the first direction is in a range of 1.5 mm to 10 mm, inclusive.

In some embodiments, the isolation film has a first edge and a second edge that are in parallel and arranged in a second direction. In the second direction, the first edge is closer to the display region than the second edge. The second direction is a direction perpendicular to an extension direction of the side edge of the first optical adhesive layer corresponding to the second peripheral region. In the second direction, the first edge of the isolation film is located between an edge of the first alignment mark proximate to the display region and an edge of the plurality of peripheral signal lines proximate to the display region. Alternatively, the first edge of the isolation film substantially coincides with the edge of the plurality of peripheral signal lines proximate to the display region. The second edge of the isolation film is substantially flush with an edge of the corresponding lug away from the display region.

In some embodiments, a dimension of the isolation film in the second direction is in a range of 0.5 mm to 1 mm, inclusive.

In some embodiments, two first alignment marks are disposed in the first peripheral region, the two first alignment marks are respectively located on two sides of the second peripheral region, and the two first alignment marks are configured to mark a bending position of the second peripheral region. The first optical adhesive layer has two lugs, and the two lugs are respectively located on the two sides of the second peripheral region. The at least one isolation film includes two isolation films, and the two isolation films are respectively located on the two sides of the second peripheral region.

In some embodiments, the second peripheral region of the display panel is capable of being bent to a side of a non-display surface of the display module. The display panel includes sub-pixels disposed in the display region and a plurality of fan-out wires disposed in the second peripheral region, and the plurality of fan-out wires are electrically connected to the sub-pixels in the display region. The display module further includes a display driver chip electrically connected to the plurality of fan-out wires, and the display driver chip is capable of being disposed on the side of the non-display surface of the display module along with bending of the second peripheral region.

In some embodiments, the display module further includes a flexible printed circuit and a touch driver chip. The flexible printed circuit is disposed on a side of the touch panel. The flexible printed circuit and the second peripheral region are located on a same side of the display module, and the flexible printed circuit is capable of being bent to the side of the non-display surface of the display module. The touch driver chip is disposed on the flexible printed circuit, and the touch driver chip is electrically connected to the plurality of peripheral signal lines of the touch panel through the flexible printed circuit.

In some embodiments, the isolation film is a light-shielding tape.

In some embodiments, a material of the first alignment mark is metal. The display panel includes a base substrate, and at least one metal conductive layer disposed on a side of the base substrate. The first alignment mark is disposed in a metal conductive layer in the at least one metal conductive layer.

In some embodiments, the display module further includes: a circular polarizer disposed on a side of the touch panel away from the display panel, a second optical adhesive layer disposed on a side of the circular polarizer away from the display panel, and a cover plate disposed on a side of the second optical adhesive layer away from the touch panel.

In another aspect, a display apparatus is provided. The display apparatus includes the display module described in any of the above embodiments.

In yet another aspect, an assembly method for a display module is provided. The assembly method includes: cutting a base material of an isolation film to obtain at least one initial isolation film having a shape with an initial target size; attaching the at least one initial isolation film to a surface of a base material of a first optical adhesive layer at a target position; cutting the base material of the first optical adhesive layer attached with the at least one initial isolation film to obtain a first optical adhesive layer having a shape with a target size, and to obtain at least one isolation film having another shape with another target size; and using the first optical adhesive layer attached with the at least one isolation film to make a display panel adhere to a touch panel.

The display panel has a display region and a peripheral region, and includes at least one alignment mark in the peripheral region. The touch panel includes a plurality of peripheral signal lines. An orthographic projection of the plurality of peripheral signal lines on a plane where the display panel is located at least partially overlaps with an orthographic projection of the at least one alignment mark on the plane where the display panel is located. An orthographic projection of each isolation film on the plane where the display panel is located covers an alignment mark.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1A:
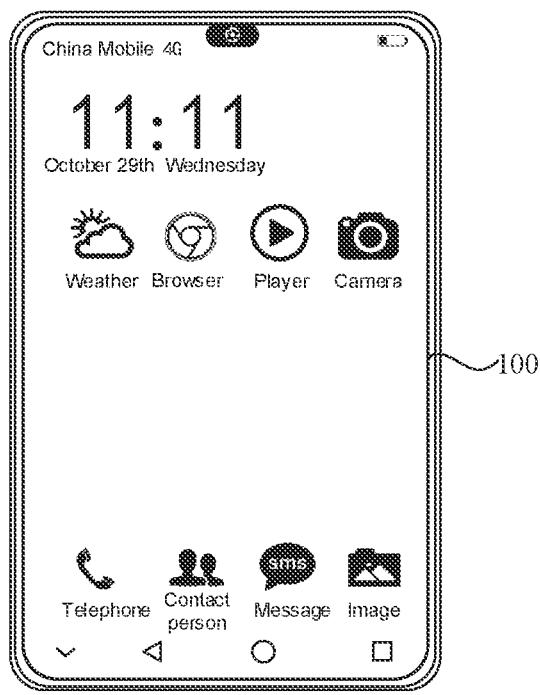
FIG. 1A is a diagram showing a structure of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, unless otherwise specified, the term "a plurality of" or "the plurality of" means two or more.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

As used herein, depending on the context, the term "if" is optionally construed as "when" or "in a case where" or "in response to determining that" or "in response to detecting". Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "applicable to" or "configured to" as used herein means an open and inclusive expression, which does not exclude devices that are applicable to or configured to perform additional tasks or steps.

In addition, the phrase "based on" used herein is meant to be open and inclusive, since a process, step, calculation, or other action that is "based on" one or more of the stated conditions or values may, in practice, be based on additional conditions or values exceeding those stated.

The term "about", "approximately", or "substantially" as used herein includes a stated value and an average value within an acceptable range of deviation of a particular value. The acceptable range of deviation is determined by a person of ordinary skill in the art in consideration of measurement in question and errors associated with the measurement of a particular quantity (i.e., limitations of a measurement system).

Exemplary embodiments are described herein with reference to sectional views and/or plan views as idealized exemplary drawings. In the accompanying drawings, thickness of layers and sizes of regions are enlarged for clarity. Variations in shapes relative to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

As shown in FIG. 1A, some embodiments of the present disclosure provide a display apparatus 200, and the display apparatus 200 is a touch display apparatus. In some embodiments, the touch display apparatus may be a liquid crystal display (LCD) apparatus. Alternatively, the touch display apparatus may be an electroluminescent display apparatus or a photoluminescent display apparatus. In a case where the touch display apparatus is the electroluminescent display apparatus, the electroluminescent display apparatus may be an organic light-emitting diode (OLED) display apparatus or a quantum dot light-emitting diode (QLED) display apparatus. In a case where the display apparatus is the photoluminescent display apparatus, the photoluminescent display apparatus may be a quantum dot photoluminescent display apparatus.

The display apparatus 200 includes a display module 100 and a housing, and the housing and the display module 100 are assembled to form the display apparatus.

Figure 1B:
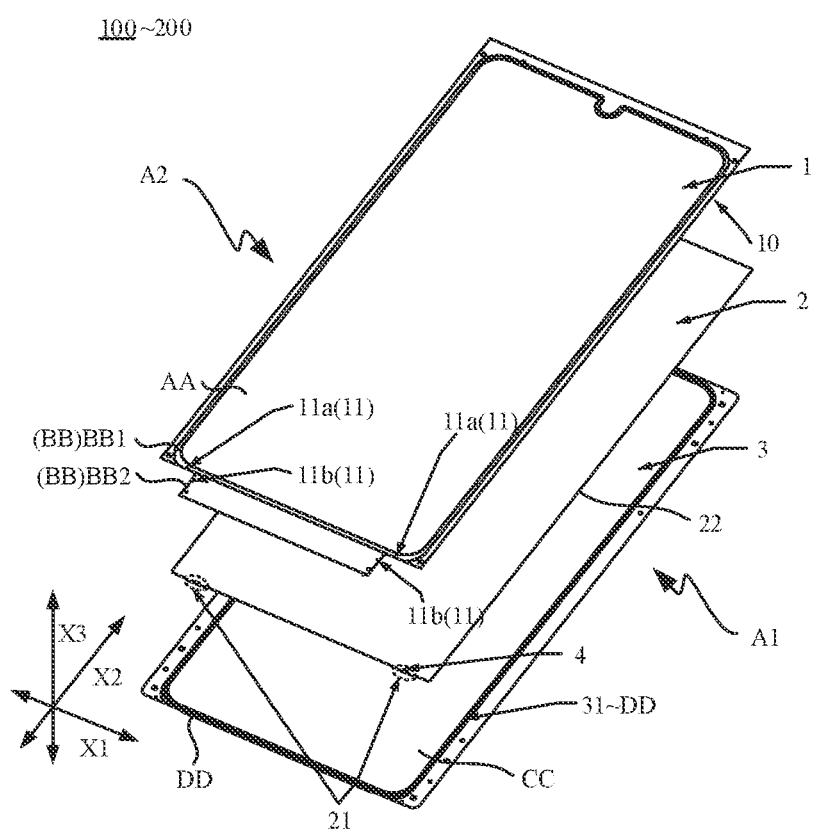
FIG. 1B is a diagram showing a structure of a display module, in accordance with some embodiments.
Figure 7:
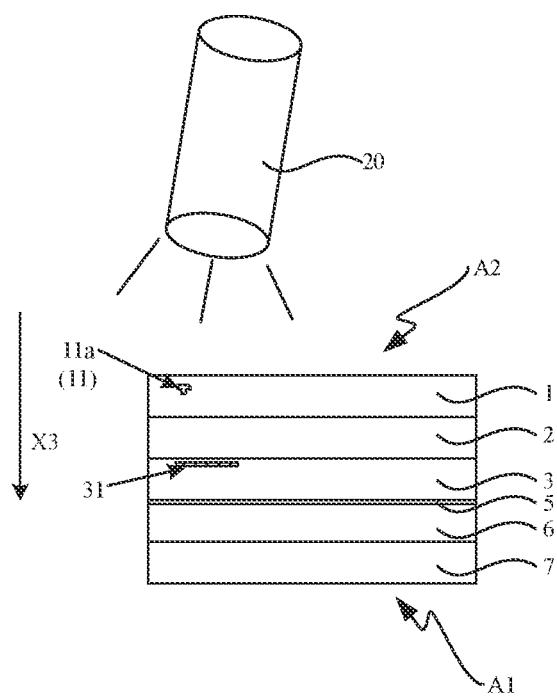
FIG. 7 is a diagram showing a structure of another display module, in accordance with some embodiments.

As shown in FIGS. 1B and 7, the display module 100 provided by some embodiments of the present disclosure includes a display panel 1, a first optical adhesive layer 2 and a touch panel 3. Two opposite sides of the display module 100 in a third direction X3 are a side A1 of a display surface and a side A2 of a non-display surface of the display module 100.

The display panel 1, the first optical adhesive layer 2 and the touch panel 3 are sequentially arranged. The first optical adhesive layer 2 is disposed on a side of a display surface 10 of the display panel 1. A surface of the display panel 1 proximate to the touch panel 3 is the display surface of the display panel, and a surface of the touch panel 3 away from the display panel 1 is a touch surface of the touch panel. The first optical adhesive layer 2 is configured to attach the display panel 1 to the touch panel 3.

In some embodiments, as shown in FIG. 7, the display module 100 further includes a circular polarizer 5, a second optical adhesive layer 6 and a cover plate 7. The circular polarizer 5 is disposed on a side of the touch panel 3 away from the display panel 1, the second optical adhesive layer 6 is disposed on a side of the circular polarizer 5 away from the display panel 1, and the cover plate 7 is disposed on a side of the second optical adhesive layer 6 away from the touch panel 3.

The circular polarizer 5 can block the interference of external light when the display panel 1 displays images, thereby improving contrast of the images. The cover plate 7 is configured to protect an internal structure including the display panel 1 and the touch panel 3 from external damage. For example, the cover plate 7 is a glass cover plate. The second optical adhesive layer 3 makes the cover plate 7 bonded to the circular polarizer 5.

In some embodiments, in a case where the display apparatus 200 is the liquid crystal display apparatus, the display panel 1 is a liquid crystal display panel. The display module 100 further includes a backlight assembly disposed on a side of the display panel 1 away from the touch panel 3, and the backlight assembly provides backlight source for the display panel, so that the display panel 1 can realize display.

Figure 2:
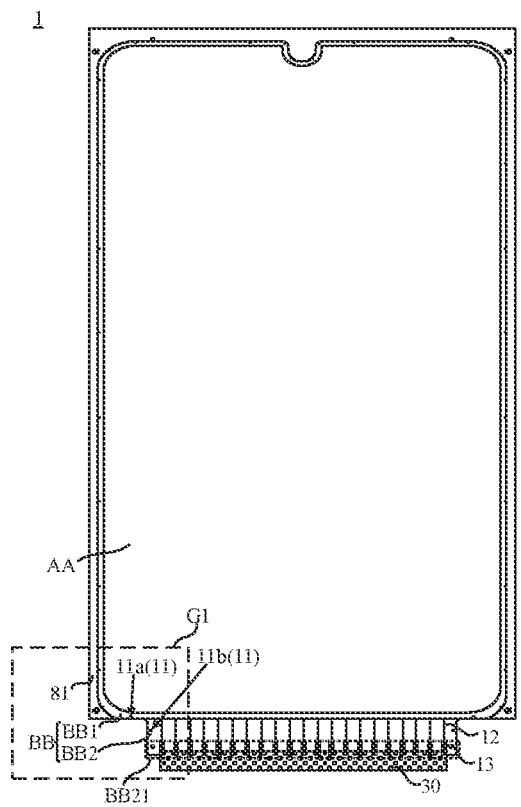
FIG. 2 is a diagram showing a structure of a display panel, in accordance with some embodiments.
Figure 3:
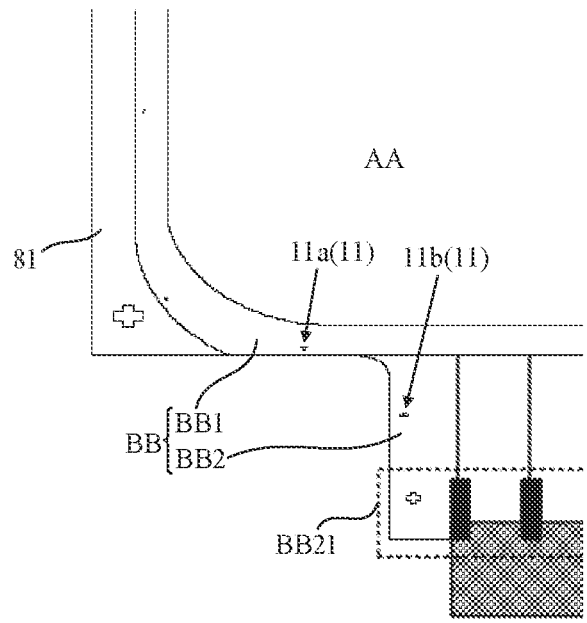
FIG. 3 is an enlarged view of the region G1 in FIG. 2.
Figure 4:
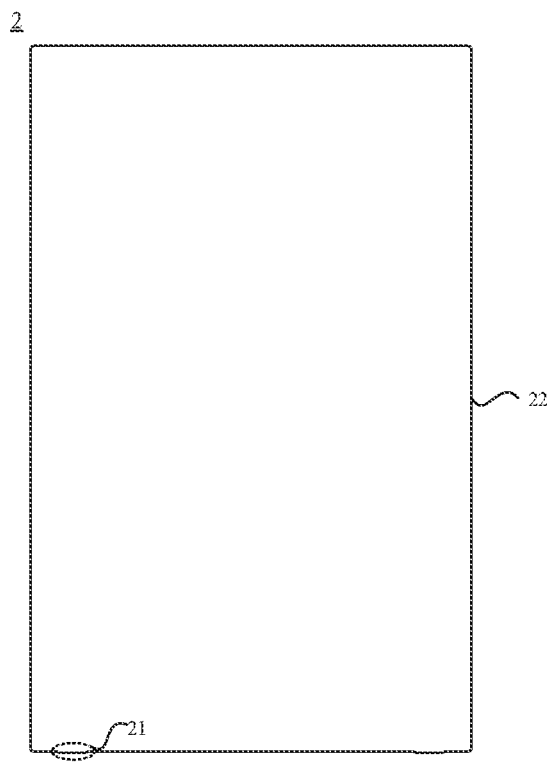
FIG. 4 is a diagram showing a structure of a first optical adhesive layer, in accordance with some embodiments.

As shown in FIGS. 2 and 3, the display panel 1 includes a display region AA and a peripheral region BB. The display region AA is provided therein with structures such as a plurality of sub-pixels, a plurality of gate lines, and a plurality of data lines. The peripheral region BB is disposed on at least one side of the display region AA. For example, as shown in FIG. 2, the peripheral region BB is disposed around the display region AA.

In some embodiments, the peripheral region BB includes a first peripheral region BB1 and a second peripheral region BB2. The first peripheral region BB1 surrounds the display region AA, and the second peripheral region BB2 is located on a side of the first peripheral region BB1 away from the display region AA. The first peripheral region BB1 is provided therein with power signal lines, gate driver circuits, etc., and the second peripheral region BB2 is provided therein with fan-out wires 12, electrostatic discharge protection circuits, bonding electrodes 13, etc. The second peripheral region BB2 may be bent to the side A2 of the non-display surface of the display module 100.

As shown in FIGS. 2 and 3, the peripheral region BB is provided with at least one alignment mark 11 therein, and the at least one alignment mark 11 is configured to mark a bending position of the second peripheral region BB2. For example, a position where the second peripheral region BB2 needs to be bent is determined according to the position of the at least one alignment mark 11, so that the second peripheral region BB2 of the display panel 1 can be bent to the side A2 of the non-display surface of the display module 100 at a fixed position.

Figure 5:
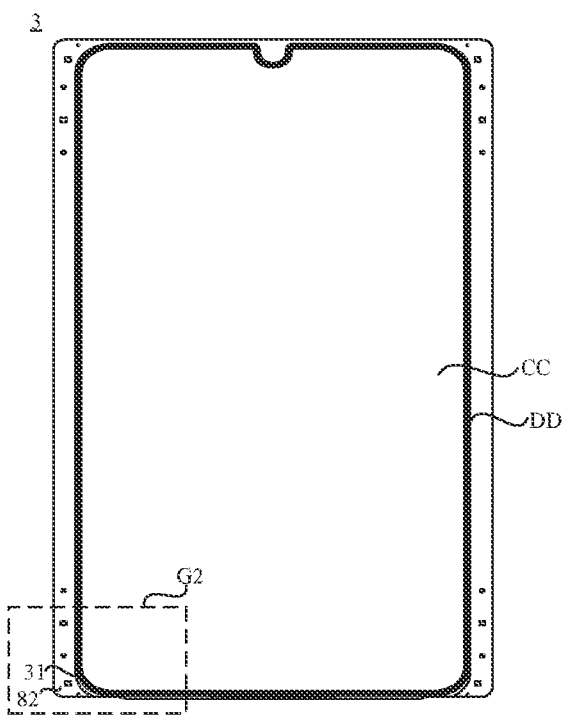
FIG. 5 is a diagram showing a structure of a touch panel, in accordance with some embodiments.
Figure 6:
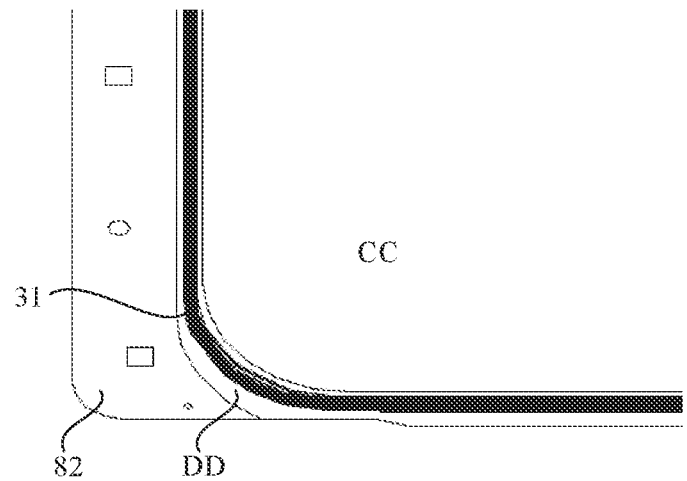
FIG. 6 is an enlarged view of the region G2 in FIG. 5.

As shown in FIGS. 5 and 6, the touch panel 3 includes a plurality of peripheral signal lines 31. For example, the touch panel 3 includes a touch region CC and a peripheral wiring region DD, and the peripheral wiring region DO is disposed around the touch region CC. The plurality of peripheral signal lines 31 are disposed in the peripheral wiring region DD, and the plurality of peripheral signal lines 31 are disposed around the touch region CC. In some embodiments, as shown in FIG. 1B, in a direction perpendicular to a plane where the display panel 1 is located, the peripheral wiring region DO corresponds to at least part of the first peripheral region BB1. That is, an orthogonal projection of the peripheral wiring region DO on the plane where the display panel 1 is located at least partially overlaps with the first peripheral region BB1. The orthogonal projection of the peripheral wiring region DO on the plane where the display panel 1 is located does not overlap with the second peripheral region BB2.

In order to make the display module have a narrow bezel, a space reserved for the peripheral region BB of the display panel 1 and for the peripheral wiring region DD of the touch panel 3 will not be too large. In some cases, an orthographic projection of the plurality of peripheral signal lines 31 on the plane where the display panel 1 is located may at least partially overlaps an orthographic projection of the at least one alignment mark 11 on the plane where the display panel 1 is located.

As shown in FIGS. 2 and 3, in some examples, the at least one alignment mark 11 includes first alignment mark(s) 11a disposed in the first peripheral region BB1. The first alignment mark 11a is an alignment mark, in the at least one alignment mark 11, an orthographic projection of which on the plane where the display panel 1 is located at least partially overlaps with the orthographic projection of the plurality of peripheral signal lines 31 on the plane where the display panel 1 is located. That is, the orthographic projection of the plurality of peripheral signal lines 31 on the plane where the display panel 1 is located at least partially overlaps with the orthographic projection of the first alignment mark 11a on the plane where the display panel 1 is located. For example, the first alignment mark 11a is disposed at a position in the first peripheral region BB1 proximate to the second peripheral region BB2.

For example, the at least one alignment mark 11 includes one or more alignment marks 11. In a case where the at least one alignment mark 11 includes one alignment mark 11, the alignment mark 11 includes one first alignment mark 11a, In a case where the at least one alignment mark 11 includes a plurality of alignment marks 11 the alignment marks 11 include at least one first alignment mark 11a. For example, the alignment marks 11 include one first alignment mark 11a or two first alignment marks 11a.

In some examples, in the case where the at least one alignment mark 11 includes the plurality of alignment marks 11, the alignment marks 11 further include second alignment mark(s) 11b disposed in the second peripheral region BB2. For example, the second alignment mark 11b is disposed at a position in the second peripheral region BB2 proximate to the first peripheral region BB1. According to the first alignment mark(s) 11a and the second alignment mark(s) 11b, the bending position of the second peripheral region BB2 can be marked. For example, the second peripheral region BB2 of the display panel 1 is bent to the side A2 of the non-display surface of the display module 100 at a boundary position of the first peripheral region BB1 and the second peripheral region BB2.

In some embodiments, referring to FIGS. 2, 3, 18 and 19, the second peripheral region BB2 of the display panel 1 is bent to the side A2 of the non-display surface of the display module 100 at the boundary position of the first peripheral region BB1 and the second peripheral region BB2. For example, in a process of bending the display panel 1 according to the first alignment mark(s) 11a and the second alignment mark(s) 11b, the position of the first alignment mark 11a remains unchanged, and the second alignment mark 11b moves as the bending of the second peripheral region BB2, so that the position of the second alignment mark 11b changes. By setting relevant parameters of the second alignment mark 11b (e.g., by setting the position of the second alignment mark 11b in a spatial coordinate system), a degree and a path of the second peripheral region BB2 being bent to a side of a non-display surface of the display panel 1 may be determined. For example, the second peripheral region BB2 may be folded to the back side of the display panel 1 at a set position with a set angle and a set radius according to the bending position determined by the first alignment mark(s) 11a and the second alignment mark(s) 11b, and the position of the second alignment mark 11b in the spatial coordinate system in the bending process.

It will be noted that, as shown in FIGS. 2 and 3, the alignment mark(s) 11 in some embodiments of the present disclosure refer to alignment mark(s) required in the bending process of the display panel 1. The alignment marks 11 include the first alignment mark(s) 11a and the second alignment mark(s) 11b, and all the alignment marks 11 are located in the peripheral region BB of the display panel 1. The display module 100 provided by some embodiments of the present disclosure further includes other marks. For example, the other marks include a mark (e.g., a cross-shaped mark) shown in FIGS. 2 and 3 on a frame 81 (a dummy structure, which will be removed after the display panel is manufactured) located around the peripheral region BB of the display panel 1, and the mark is used to perform alignment during manufacturing the display panel 1. For another example, the other marks include a cross-shaped mark shown in FIG. 3 located in the bonding region BB21 of the display panel 1. For yet another example, the other marks include marks (e.g., elliptic marks and rectangular marks) shown in FIGS. 5 and 6 on another frame 82 (another dummy structure, which will be removed after the touch panel is manufactured) located around the peripheral wiring region DO of the touch panel 3. These above marks are not used in the bending process of display panel 1 and are not included in the alignment marks 11 mentioned in the embodiments of the present disclosure.

In the production process of the display module, an identification device is required to capture and identify the at least one alignment mark 11 to determine the position of the second peripheral region BB2 being bent, so that the second peripheral region BB2 of the display panel is bent according to the position. For example, as shown in FIG. the identification device 20 is a charge-coupled device, and the charge-coupled device has a plurality of photosensitive units. The plurality of photosensitive units receive light from the identified object, and the charge-coupled device converts the light into charges, so as to generate an image based on the charges, thereby realizing the identification of the identified object.

When identifying the first alignment mark 11a, the identification device 20 is located on the side of the display panel 1 away from the touch panel 3, that is, the side A2 of the non-display surface of the display module. The first alignment mark 11a can reflect light entering the display module from the side of the display panel 1 away from the touch panel 3. The first alignment mark 11a reflects light incident on the first alignment mark 11a from the side of the display panel away from the touch panel, and the reflected light is received by the identification device 20 to realize the identification of the first alignment mark 11a. In some examples, the light entering the display module from the side of the display panel 1 away from the touch panel 3 is emitted by the identification device 20. For example, as shown in FIG. 7, the identification device 20 emits light transmitted in the third direction X3 to the display panel 1, and the light is reflected by the first alignment mark 11a and then received by the identification device 20. Alternatively, the light entering the display module from the side of the display panel 1 away from the touch panel 3 may be emitted by another device. It can be understood that the material of the first alignment mark 11a is a non-light-transmitting material which is capable of reflecting light, and the display panel 1 has light transmittance at least in a portion around the first alignment mark 11a and cannot reflect light. As a result, the first alignment mark 11a can be identified.

For the principle of identifying the second alignment mark 11b, reference may be made to the above description of the principle of identifying the first alignment mark 11a, and details are not repeated here.

Figure 23:
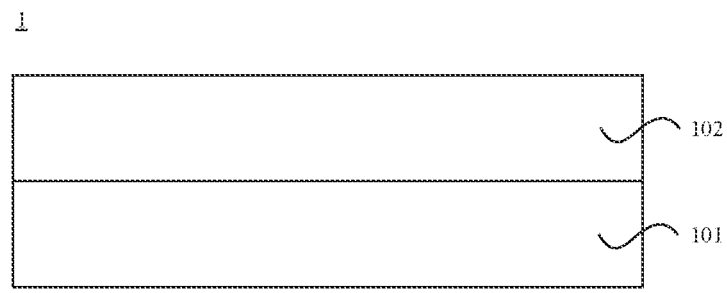
FIG. 23 is a diagram showing a structure of another display panel, in accordance with some embodiments.

In some embodiments, the first alignment mark 11a is made of metal. As shown in FIG. 23, the display panel 1 includes a base substrate 101, and at least one metal conductive layer 102 disposed on a side of the base substrate 101. The first alignment mark 11a is disposed in a metal conductive layer 102. For example, the metal conductive layer includes signal lines such as the plurality of data lines. In this way, the first alignment mark 11a and the signal lines in the display panel may be formed in the same patterning process, which may simplify the process steps.

Figure 8:
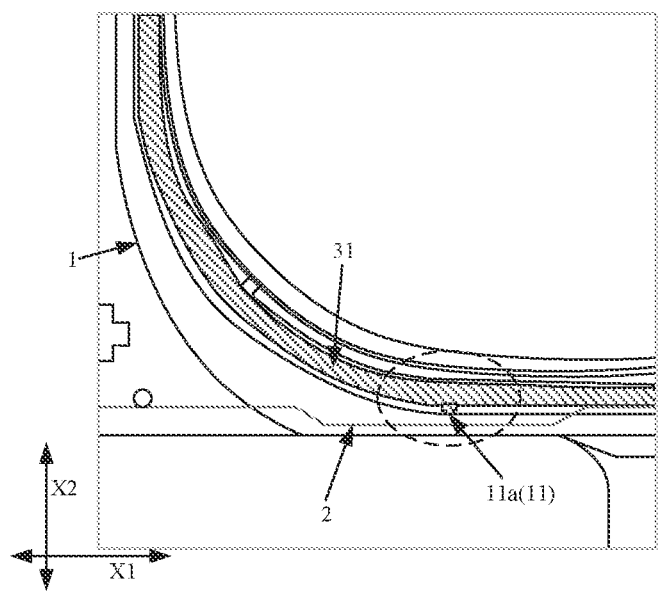
FIG. 8 is a schematic diagram of a first alignment mark in a display panel being identified, in accordance with some embodiments.
Figure 9:
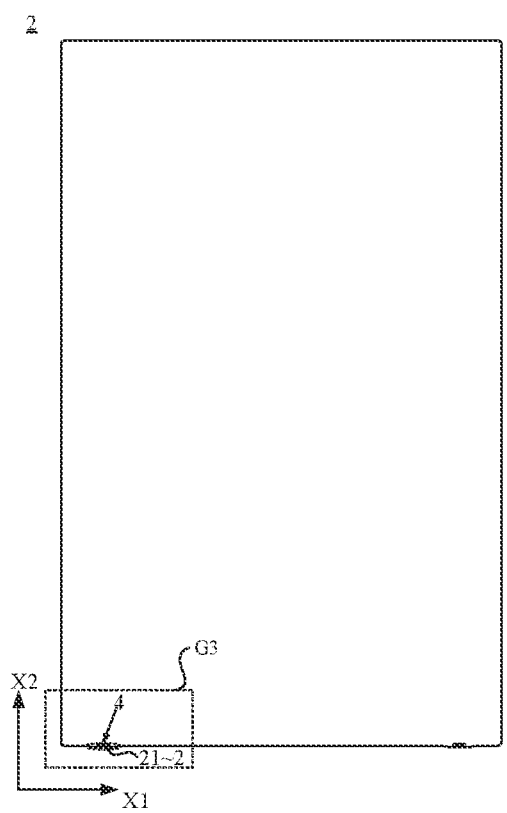
FIG. 9 is a diagram showing a structure of another first optical adhesive layer, in accordance with some embodiments.
Figure 10:
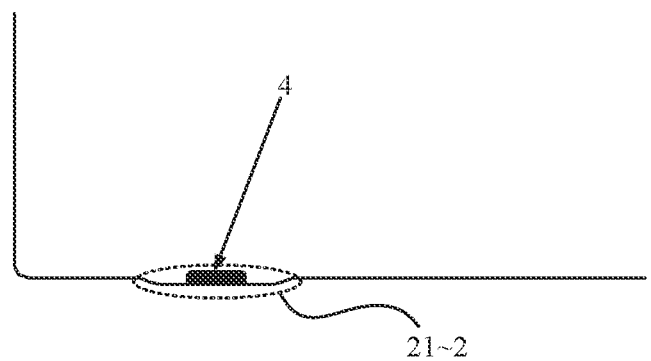
FIG. 10 is an enlarged view of the region G3 in FIG. 9.

However, the orthographic projection of the plurality of peripheral signal lines 31 on the plane where the display panel 1 is located at least partially overlaps with the orthographic projection of the at least one alignment mark 11 on the plane where the display panel 1 is located, and the plurality of peripheral signal lines 31 are metal signal lines. Therefore, as shown in FIG. 8 (a dashed region in this figure is an identified region in the display module 100, i.e., a region illuminated by the light emitted by the identification device), in a process of identifying the first alignment mark 11a by the identification device 20, the light entering the display module from the side of the display panel 1 away from the touch panel 3 can pass through the first optical adhesive layer 2 and incident onto the peripheral signal lines 31 in the touch panel 3, and the peripheral signal line 31 reflects light, so that the identification device further receives the light reflected by the peripheral signal line 31 in addition to the light reflected by the first alignment mark 11a. As a result, the image generated by the identification device based on the received light includes imaging of the first alignment mark 11a and imaging of the plurality of peripheral signal lines 31. A background color of the first alignment mark 11a is not obvious, so that the identification device 20 cannot accurately identify the first alignment mark 11a, and thus the identification device 20 has low accuracy in identifying the first alignment mark 11a. In addition, in a case where the peripheral signal lines 31 and the first alignment mark 11a are made of the same material, it is very difficult for the identification device 20 to normally identify the first alignment mark 11a, and even the first alignment mark 11a cannot be identified.

In some embodiments, as shown in FIGS. 1B, 9, 12 and 13, the display module 100 further includes at least one isolation film 4 disposed between the display panel 1 and the touch panel 3, and an orthographic projection of each isolation film 4 on the plane where the display panel 1 is located covers an alignment mark 11. The isolation film is configured to block light directed to the plurality of peripheral signal lines 31 from the side of the display panel 1 away from the touch panel 3. For example, the orthographic projection of each isolation film 4 on the plane where the display panel 1 is located covers a first alignment mark 11a. An orthographic projection of the isolation film 4 on a plane where the touch panel 3 is located at least partially overlaps with the plurality of peripheral signal lines 31, and some of the plurality of peripheral signal lines 31 that overlap with the orthographic projection of the isolation film 4 on the plane where the touch panel 3 is located are called overlapping peripheral signal lines. The isolation film is configured to block light directed to the overlapping peripheral signal lines 31 from the side of the display panel 1 away from the touch panel 3. In this way, under the shielding effect of the isolation film, the overlapping peripheral signal lines may not be irradiated by the light incident from the side of the display panel 1 away from the touch panel 3, and the overlapping peripheral signal lines cannot reflect the light to the identification device 20. The isolation film can serve as a background when the first alignment mark 11*a* is identified, so that the identification device 20 may accurately identify the first alignment mark 11*a* from the side of the display panel away from the touch panel.

Figure 14A:
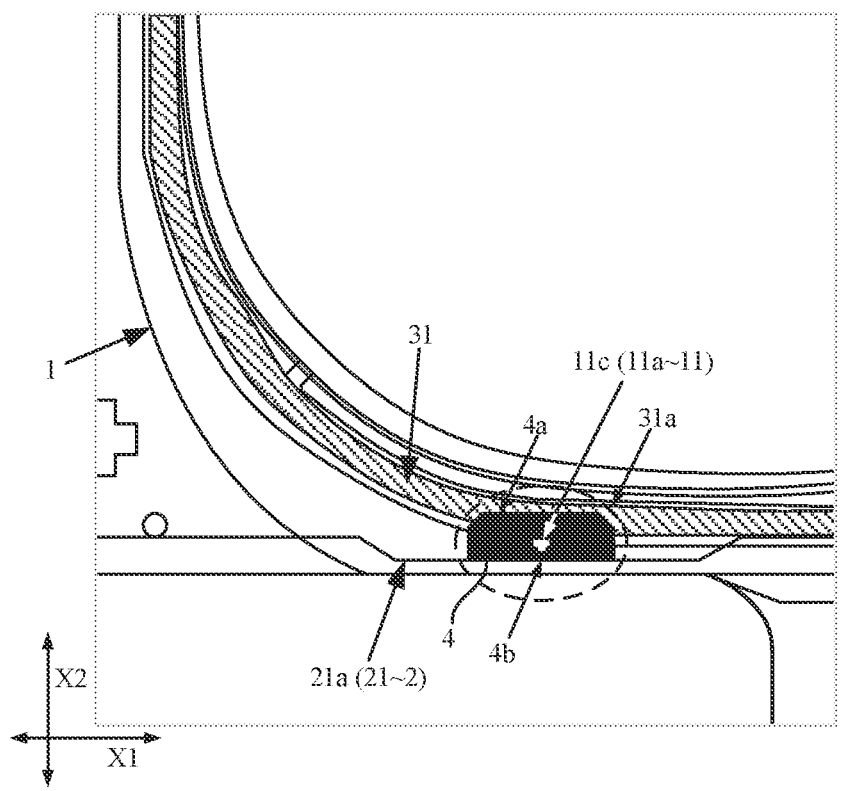
FIG. 14A is another schematic diagram of a first alignment mark in a display panel being identified, in accordance with some embodiments.
Figure 14B:
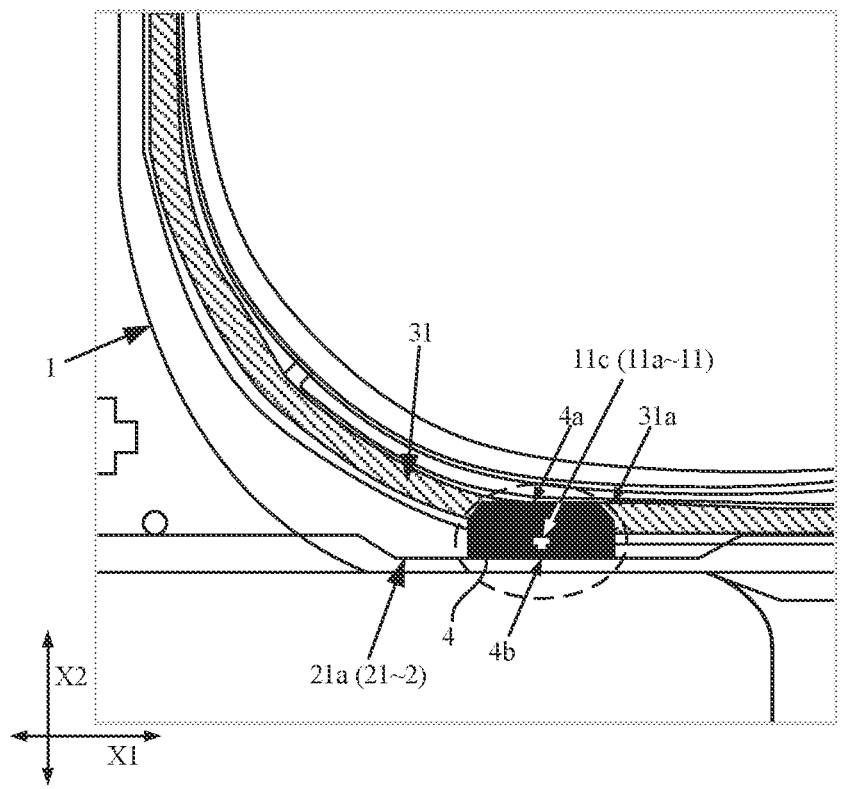
FIG. 14B is yet another schematic diagram of a first alignment mark in a display panel being identified, in accordance with some embodiments.

The isolation film(s) 4 are in one-to-one correspondence with the first alignment mark(s) 11*a*. The orthographic projection of each isolation film 4 on the plane where the display panel 1 is located covers a first alignment mark 11*a*, that is, an area of each isolation film 4 is greater than or equal to an area of a corresponding first alignment mark 11*a*, The material of the isolation film 4 is a light-shielding material that cannot allow light to pass through. In addition, the material of the isolation film 4 is a light-absorbing material that cannot reflect light or can only reflect a small amount of light. As shown in FIGS. 14A and 14B (a dashed region in each of the figures is the identified region in the display module 100, i.e., the region illuminated by the light emitted by the identification device), the isolation film 4 isolates the first alignment mark 11*a* from the peripheral signal lines 31. When the identification device 20 identifies the first alignment mark 11*a*, the isolation film 4 can block the light directed to the plurality of peripheral signal lines 31 from the side of the display panel 1 away from the touch panel 3. In this way, the light directed from the side of the display panel 1 away from the touch panel 3 cannot incident onto the plurality of peripheral signal lines 31, the plurality of peripheral signal lines 31 cannot reflect the light, and the isolation film 4 can absorb light to serve as the background. As a result, the identification device 20 can only receive the light reflected by the first alignment mark 11*a*, so that the first alignment mark 11*a* may be accurately identified, thereby improving the accuracy of the identification device 20 in identifying the first alignment mark 11*a*, Thus, it may be solved that the first alignment mark 11*a* cannot be accurately identified due to a fact that the orthographic projection of the plurality of peripheral signal lines 31 on the plane where the display panel 1 is located at least partially overlaps with the orthographic projection of the first alignment mark 11*a* on the plane where the display panel 1 is located.

It will be noted that, the description that the isolation film can serve as the background when the first alignment mark 11*a* is identified means that when the identification device 20 identifies the first alignment mark 11*a*, the isolation film can absorb light but cannot reflect light, and thus the identification device can only receive the light reflected by the first alignment mark 11*a*, so as to perform imaging based on the light. During imaging, a color of a portion corresponding to the isolation film can be used as a background color, so that the first alignment mark 11*a* can be clearly and accurately identified.

Since in the direction perpendicular to the plane where the display panel 1 is located, the orthogonal projection of the peripheral wiring region DD on the plane where the display panel 1 is located does not overlap with the second peripheral region BB2, and the second alignment mark 11*b* is disposed in the second peripheral region BB2, a case that the orthographic projection of the plurality of peripheral signal lines 31 on the plane where the display panel 1 is located at least partially overlaps with the orthographic projection of the second alignment mark 11*b* on the plane where the display panel 1 is located will not generally occur. Therefore, the identification device 20 can normally identify the second alignment mark 11*b*, and there is no need to provide the second alignment mark 11*b* with a corresponding isolation film 4 by which the second alignment mark 11*b* is isolated from the peripheral signal line 31. Of course, the embodiments of the present disclosure do not exclude a case that the isolation film 4 is disposed between the display panel 1 and the touch panel 3, and the orthographic projection of each isolation film 4 on the plane where the display panel 1 is located covers a second alignment mark 11*b*.

It can be understood that the material of the isolation film 4 is different from the material of the first alignment mark 11*a*, and has the characteristics of light shielding and light absorption. In some examples, the isolation film is a light-shielding tape. For example, the isolation film is a dark-colored light-shielding tape, and the dark color may be black, dark brown, or the like.

Figure 12:
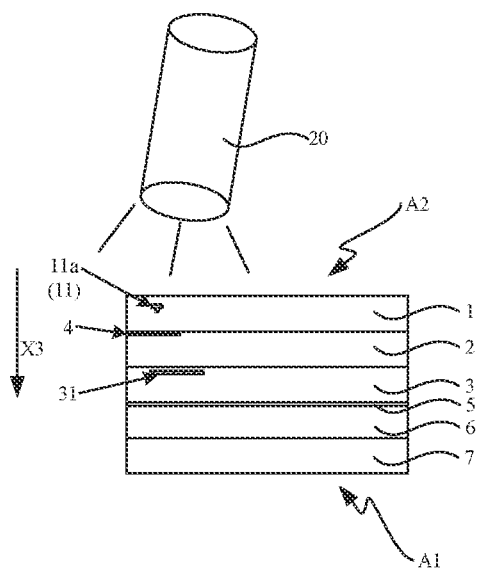
FIG. 12 is a diagram showing a structure of yet another display module, in accordance with some embodiments.
Figure 13:
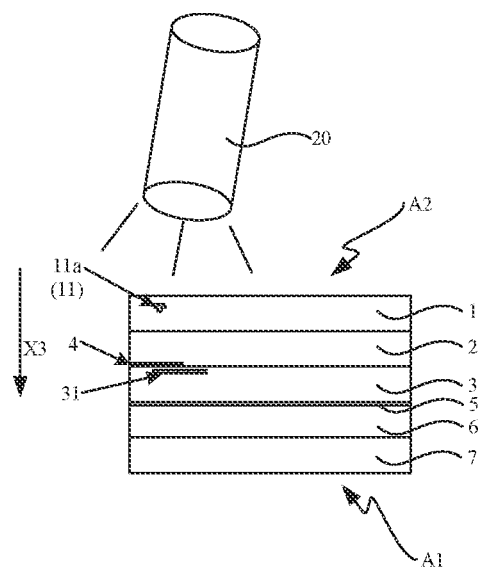
FIG. 13 is a diagram showing a structure of yet another display module, in accordance with some embodiments.

In some examples, the position of the at least one isolation film 4 is as follows. As shown in FIG. 12, the at least one isolation film 4 is disposed on a side of the first optical adhesive layer 2 proximate to the display panel 1. Alternatively, as shown in FIG. 13, the at least one isolation film 4 is disposed on a side of the first optical adhesive layer 2 proximate to the touch panel 3.

In some embodiments, a surface of the isolation film 4 away from the first optical adhesive layer 2 has adhesion, which makes the isolation film 4 adhere to the display panel 1 or the touch panel 3.

A surface of the isolation film 4 proximate to the first optical adhesive layer 2 has no adhesion, and the isolation film 4 is bonded to the first optical adhesive layer 2 through adhesion of the first optical adhesive layer 2.

The surface of the isolation film 4 away from the first optical adhesive layer 2 has adhesion. That is, in FIG. 12, a surface of the isolation film 4 proximate to the display panel 1 has adhesion, which makes the isolation film adhere to the display panel 1; alternatively, in FIG. 13, a surface of the isolation film 4 proximate to the touch panel 3 has adhesion, which makes the isolation film 4 adhere to the touch panel 3. The first optical adhesive layer 2 itself has adhesion. Therefore, the surface of the isolation film 4 proximate to the first optical adhesive layer 2 does not have adhesion, and the isolation film 4 may be bonded to the first optical adhesive layer 2 through the adhesion of the first optical adhesive layer 2. In this way, in a case where the display panel 1 and the touch panel 3 can be firmly bonded to each other to prevent them from falling off easily, one surface of the isolation film 4 has adhesion, and the other surface of the isolation film 4 has no adhesion, Compared with a design that both surfaces of the isolation film 4 have adhesion, the thickness of the isolation film 4 may be reduced, a level difference between the isolation film 4 and the first optical adhesive layer 2 may be reduced, and thus the flatness of the display module 100 may be improved.

Figure 15A:
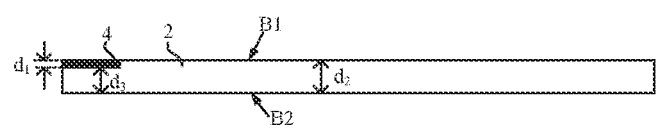
FIG. 15A is a cross-sectional view of a structure of a first optical adhesive layer and an isolation film, in accordance with some embodiments.
Figure 15B:
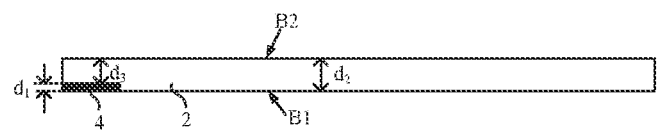
FIG. 15B is a cross-sectional view of another structure of a first optical adhesive layer and an isolation film, in accordance with some embodiments.

In some embodiments, as shown in FIGS. 15A and 15B, the first optical adhesive layer 2 includes a first surface B1 on which the isolation film 4 is disposed, and a second surface B2 opposite to the first surface B1. In a thickness direction of the first optical adhesive layer 2, opposite to the second surface B2, a portion of the first surface B1 not covered by the isolation film 4 is flush or substantially flush with a surface of the isolation film 4 away from the second surface.

In the above embodiments, since the material of the first optical adhesive layer 2 is optical adhesive (e.g., the material of the first optical adhesive layer is organic silica gel or acrylic resin), the material of the first optical adhesive layer 2 is soft, and at least a part of the isolation film can be embedded in the first optical adhesive layer 2. For example, as shown in FIGS. 15A and 15B, in a case where the thickness of the isolation film 4 is thin, the isolation film 4 is completely embedded in the first optical adhesive layer 2, so that the first optical adhesive layer may eliminate a certain level difference. The portion of the first surface B1 of the first optical adhesive layer 2 not covered by the isolation film 4 is flush or substantially flush with the surface of the isolation film 4 away from the second surface B2. As a result, the flatness of the display module 100 may be further improved.

In some examples, as shown in FIGS. 15A and 15B, a thickness $d_1$ of the isolation film 4 is small. In this way, the flatness of the display module 100 may be improved and the overall thickness of the display module 100 does not increase. For example, a ratio of a thickness $d_2$ of a portion of the first optical adhesive layer 2 not covered by the isolation film 4 to the thickness $d_1$ of the isolation film 4 is in a range of 10 to 30, inclusive.

In some embodiments, the thickness $d_2$ of the portion of the first optical adhesive layer 2 not covered by the isolation film 4 is in a range of 100 µm to 150 µm, inclusive, and the thickness $d_1$ of the isolation film 4 is in a range of 5 µm to 10 µm, inclusive, so that a thickness $d_3$ of a portion of the first optical adhesive layer 2 covered by the isolation film 4 is in a range of 105 µm to 160 µm, inclusive.

For example, the thickness $d_2$ of the portion of the first optical adhesive layer 2 not covered by the isolation film 4 is 100 µm, and the thickness $d_1$ of the isolation film is 5 µm, so that the thickness $d_3$ of the portion of the first optical adhesive layer 2 covered by the isolation film 4 is 105 µm, and the ratio of the thickness $d_2$ of the portion of the first optical adhesive layer 2 not covered by the isolation film 4 to the thickness $d_1$ of the isolation film 4 is 20. Alternatively, the thickness $d_2$ of the portion of the first optical adhesive layer 2 not covered by the isolation film 4 is 120 µm, and the thickness $d_1$ of the isolation film is 10 µm, so that the thickness $d_3$ of the portion of the first optical adhesive layer 2 covered by the isolation film 4 is 130 µm, and the ratio of the thickness $d_2$ of the portion of the first optical adhesive layer 2 not covered by the isolation film 4 to the thickness $d_1$ of the isolation film 4 is 12. Alternatively, the thickness $d_2$ of the portion of the first optical adhesive layer 2 not covered by the isolation film 4 is 150 µm, and the thickness $d_1$ of the isolation film is 5 µm, so that the thickness $d_3$ of the portion of the first optical adhesive layer 2 covered by the isolation film 4 is 155 µm, and the ratio of the thickness $d_2$ of the portion of the first optical adhesive layer 2 not covered by the isolation film 4 to the thickness $d_1$ of the isolation film 4 is 30.

In some embodiments, as shown in FIGS. 4, 9 to 11, in a plurality of side edges 22 of the first optical adhesive layer 2, a side edge corresponding to an edge of the display panel where the second peripheral region 13132 is located is provided with at least one lug 21 thereon, and an orthographic projection of each first alignment mark 11a on the first optical adhesive layer 2 is within the range of a lug 21. Each isolation film 4 is disposed on a lug 21.

For example, as shown in FIG. 1B, the first optical adhesive layer 2 has a plurality of side edges 22. The side edge of the first optical adhesive layer 2 corresponding to the second peripheral region BB2 has two lugs 21, and the first peripheral region BB1 of the display panel 1 is provided with two first alignment marks 11a therein. The orthographic projection of each first alignment mark 11a on the first optical adhesive layer 2 is within the range of a lug 21, and each isolation film 4 is disposed on a lug 2. In this way, in a direction parallel to the third direction X3, a first alignment mark 11a corresponds to a position of a lug 21, and the first alignment mark 11a corresponds to a position of an isolation film 4. Therefore, the isolation film 4 can sufficiently function as the background when the first alignment mark 11a is identified.

Figure 11:
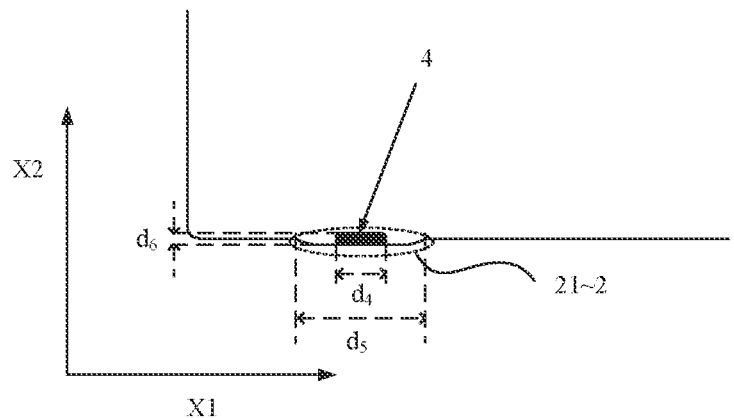
FIG. 11 is another enlarged view of the region G3 in FIG. 9.

In some embodiments, as shown in FIG. 11, a ratio of a dimension $d_4$ of the isolation film 4 in a first direction X1 to a dimension $d_5$ of the lug 21 in the first direction X1 is in a range of 0.5 to 1, inclusive. The first direction X1 is parallel to an extending direction of a side edge of the first optical adhesive layer 2 corresponding to the second peripheral region BB2.

In some embodiments, the dimension $d_4$ of the isolation film 4 in the first direction X1 is in a range of 1.5 mm to 10 mm, inclusive. For example, the dimension $d_4$ of the isolation film 4 in the first direction X1 is 1.5 mm, and the dimension $d_5$ of the lug 21 in the first direction X1 is 3 mm. Alternatively, the dimension $d_4$ of the isolation film 4 in the first direction X1 is 2 mm, and the dimension $d_5$ of the lug 21 in the first direction X1 is 4 mm. Alternatively, the dimension $d_4$ of the isolation film 4 in the first direction X1 is 4 mm, and the dimension $d_5$ of the lug 21 in the first direction X1 is 4 mm.

In some embodiments, as shown in FIGS. 14A and 14B, the isolation film 4 has a first edge 4a and a second edge 4b that are in parallel and disposed in a second direction. In a direction parallel to the second direction X2 and parallel to the plane where the display panel 1 is located, the first edge 4a is closer to the display region AA than the second edge 4b. The second direction X2 is a direction perpendicular to the extending direction of the side edge of the first optical adhesive layer 2 corresponding to the second peripheral region BB2, and the first direction X1 is perpendicular to the second direction X2.

In the direction parallel to the second direction X2 and parallel to the plane where the display panel is located, as shown in FIG. 14A, the first edge 4a of the isolation film 4 is located between an edge 11c of the first alignment mark 11a proximate to the display region AA and an edge 31a of the plurality of peripheral signal lines 31 proximate to the display region AA. Alternatively, as shown in FIG. 14B, the first edge 4a of the isolation film 4 coincides or substantially coincides with the edge 31a of the plurality of peripheral signal lines 31 proximate to the display region AA.

The second edge 4b of the isolation film 4 is flush or substantially flush with an edge 21a of the lug 21 away from the display region AA.

With such a design, it is possible to ensure that in the second direction X2, the first edge 4a of the isolation film 4 exceeds the edge 11c of the first alignment mark 11a proximate to the display region AA, and does not exceed the edge 31a of the plurality of peripheral signal lines 31 proximate to the display region AA. In this way, the orthographic projection of each isolation film 4 on the plane where the display panel 1 is located can cover the first alignment mark 11a, and the isolation film 4 can isolate the first alignment mark 11a from the peripheral signal lines 31, so that the first alignment mark 11a can be identified. In addition, the second edge 4b of the isolation film 4 is flush or substantially flush with the edge of the lug 21 away from the display region AA, so that the position of the isolation film 4 can be determined when the isolation film 4 is attached, so as to facilitate the attachment of the isolation film 4 and the first optical adhesive layer 2.

For example, as shown in FIG. 11, a dimension $d_6$ of the isolation film 4 in the second direction is in a range of 0.5 mm to 1 mm, inclusive. For example, the dimension $d_6$, of the isolation film 4 in the second direction is 0.5 mm, 0.63 mm, or 1 mm.

In some embodiments, as shown in FIG. 1B, the first peripheral region BB1 of the display panel 1 is provided with two first alignment marks 11a therein. The two first alignment marks 11a are located in the first peripheral region BB1 and proximate to the second peripheral region BB2, and are located on both sides of the second peripheral region 8132, The two first alignment marks 11a are configured to mark the position at which the second peripheral region 332 is bent. For example, the second peripheral region 13132 may be bent to the side A2 of the non-display surface of the display module along a straight line where the two first alignment marks 11a are located.

As shown in FIG. 1B, the first optical adhesive layer 2 has two lugs 21, and the two lugs 21 are located on both sides of the second peripheral region 332. The display module 100 includes two isolation films 4, the two isolation films 4 are located on both sides of the second peripheral region 332, and each isolation film 4 is located on a lug 21.

The second peripheral region BB2 of the display panel 1 is provided with two second alignment marks 11b therein. The two second alignment marks 11b are located in the second peripheral region 1332 and proximate the first peripheral region 8131. The two second alignment marks 11b are disposed in the second peripheral region 332 and at positions proximate to two opposite side edges of the second peripheral region 3132, and extending directions of the two opposite side edges are parallel to the second direction X2.

In this way, positions of the two isolation films 4 are in one-to-one correspondence with positions of the two first alignment marks 11a, so that the two first alignment marks 11a can be identified. In addition, the two first alignment marks 11a cooperate with the two second alignment marks 11b, so that the bending position of the second peripheral region BB2 may be accurately marked.

In some embodiments, as shown in FIGS. 2 and 3, in addition to the plurality of fan-out wires 12, the second peripheral region BB2 of the display panel 1 is further provided with the plurality of bonding electrodes 13 therein. The plurality of bonding electrodes 13 are located in the bonding region BB21 in the second peripheral region BB2, and the plurality of bonding electrodes 13 are connected in one-to-one correspondence with the plurality of fan-out wires 12.

The display module 100 further includes a display driver chip 30 electrically connected to the plurality of fan-out wires 12, and the display driver chip 30 may be disposed on the side A2 of the non-display surface of the display module 100 along with the bending of the second peripheral region BB2. For example, the display driver chip 30 is electrically connected to the plurality of fan-out wires 12 through the plurality of bonding electrodes 13. In this way, the display driver chip 30 can be disposed on the side A2 of the non-display surface of the display module 100, thereby reducing the size of the bezel of the display module.

In some examples, the display driver chip 30 includes circuits such as a source driver circuit, a gate driver circuit, and a timing controller, and is used to transmit display signals to the display panel and control the display panel for display.

Figure 16:
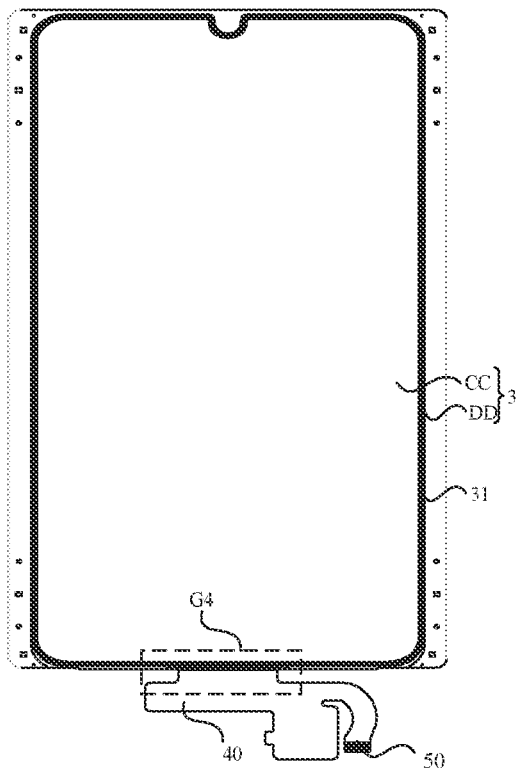
FIG. 16 is a diagram showing a structure of a touch panel and a flexible printed circuit, in accordance with some embodiments.
Figure 17:
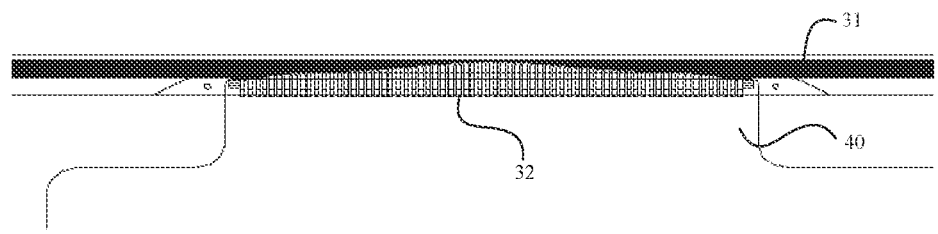
FIG. 17 is an enlarged view of the region G4 in FIG. 16.

In some embodiments, as shown in FIGS. 16 and 17, the display module 100 further includes a flexible printed circuit 40 and a touch driver chip 50.

The flexible printed circuit 40 is disposed on a side of the touch panel 3, the flexible printed circuit 40 and the second peripheral region BB2 are located on the same side of the display module 100, and the flexible printed circuit 40 may be bent to the side A2 of the non-display surface of the display module 100.

The touch driver chip 50 is disposed on the flexible printed circuit 40, and the touch driver chip 50 is electrically connected to the plurality of peripheral signal lines 31 of the touch panel 3 through the flexible printed circuit 40. The touch driver chip 50 is configured to provide touch signals to control the touch panel to realize the touch function.

As shown in FIG. 17, the touch panel 3 is further provided therein with a plurality of connection electrodes 32 electrically connected to the plurality of peripheral signal lines 31, and the plurality of connection electrodes 32 are located on a side of the touch panel proximate to the second peripheral region BB2. The touch region CC of the touch panel 3 is provided with a plurality of touch electrodes therein, and the plurality of touch electrodes are electrically connected to the plurality of peripheral signal lines 31. The flexible printed circuit 40 is electrically connected to the plurality of peripheral signal lines 31 through the plurality of connection electrodes 32, Therefore, the touch signals provided by the touch driver chip can be transmitted to the plurality of touch electrodes through the flexible printed circuit 40, the plurality of connection electrodes 32 and the plurality of peripheral signal lines 31, so as to control the touch panel to realize the touch function.

Figure 18:
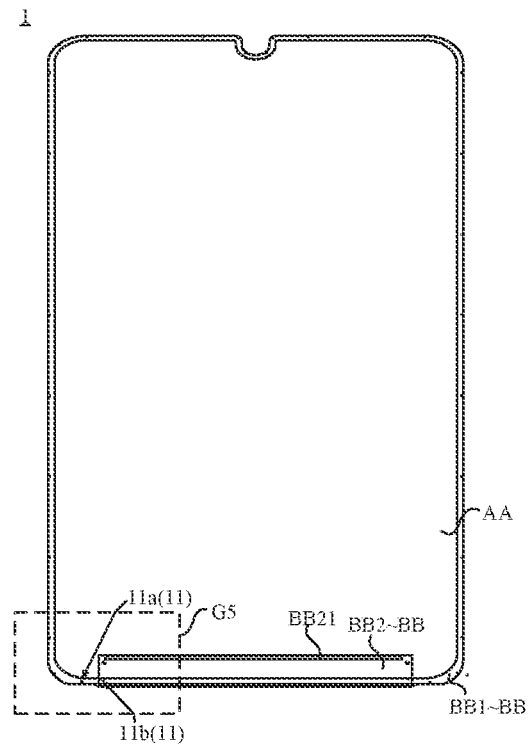
FIG. 18 is a schematic diagram of a second peripheral region of a display panel bent to a back side thereof, in accordance with some embodiments.
Figure 19:
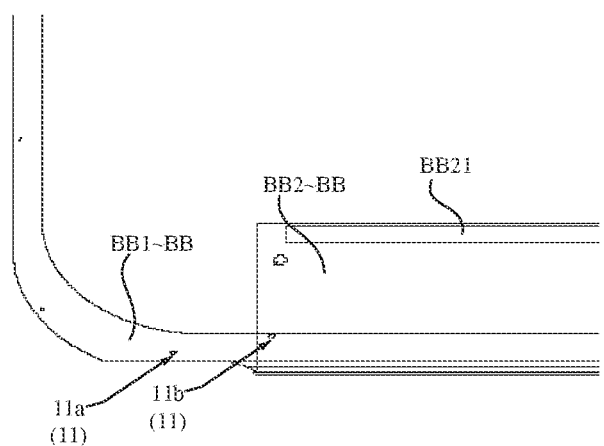
FIG. 19 is an enlarged view of the region G5 in FIG. 18.
Figure 20:
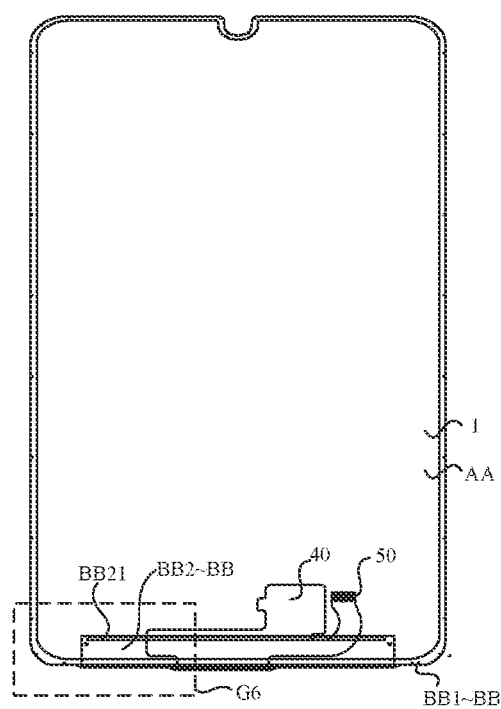
FIG. 20 is a schematic diagram of both a second peripheral region and a flexible printed circuit of a display panel bent to the back side thereof, in accordance with some embodiments.
Figure 21:
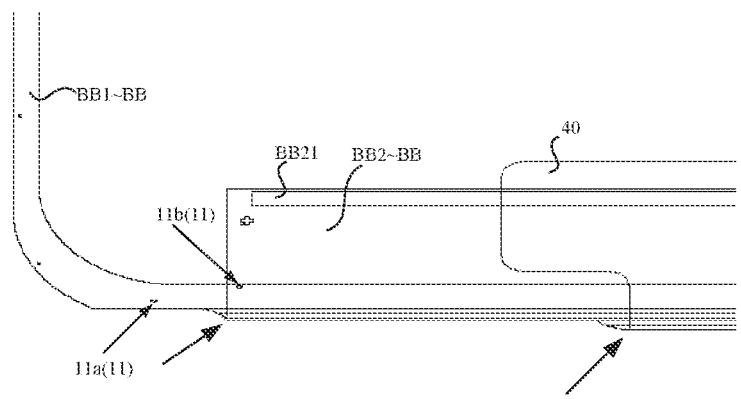
FIG. 21 is an enlarged view of the region G6 in FIG. 20.

As a possible design, referring to FIGS. 1B, and 18 to 21, in the display module 100, FIG. 18 shows the back side (the non-display surface) of the display panel 1, the second peripheral region 13132 of the display panel 1 is bent toward the side A2 of the non-display surface of the display module 100, and FIGS. 18 and 19 show the bonding region BB21 in the second peripheral region BB2. It can be understood that the display driver chip 30 is coupled to the bonding electrodes in the bonding region BB21, and the display driver chip 30 is disposed on the side A2 of the non-display surface of the display module 100. As shown in FIGS. 20 and 21, the flexible printed circuit 40 is bent toward the side A2 of the non-display surface of the display module 100, a part of the flexible printed circuit 40 is disposed in the second peripheral region BB2, bent to the back side, of the display panel 1, and the other part of the flexible printed circuit 40 is disposed on the non-display surface of the display module 100. As shown in FIG. 21, the position indicated by the arrow is the position where the second peripheral region 332 and the flexible printed circuit 40 are bent. In this way, the size of the bezel of the display module 100 may be reduced.

In some embodiments, as shown in FIG. 1A, the display apparatus may be any apparatus that displays images whether in motion (e.g., a video) or stationary (e.g., a still image), and regardless of text or image. More specifically, it is contemplated that the described embodiments may be implemented in or associated with a variety of electronic devices, and the variety of electronic devices may include (but are not limited to), for example, mobile phones, wireless devices, personal digital assistants (PDAs), hand-held or portable computers, global positioning system (GPS) receivers/navigators, cameras, MPEG-4 Part 14 (MP4) video players, video cameras, game consoles, watches, clocks, calculators, TV monitors, flat panel displays, computer monitors, car displays (e.g., odometer displays), navigators, cockpit controllers and/or displays, camera view displays (e.g., display of rear view camera in vehicles), electronic photos, electronic billboards or signs, projectors, architectural structures, packaging and aesthetic structures (e.g. displays for displaying an image of a piece of jewelry), etc. For example, the display apparatus 200 shown in FIG. 1A is a mobile phone.

Figure 22:
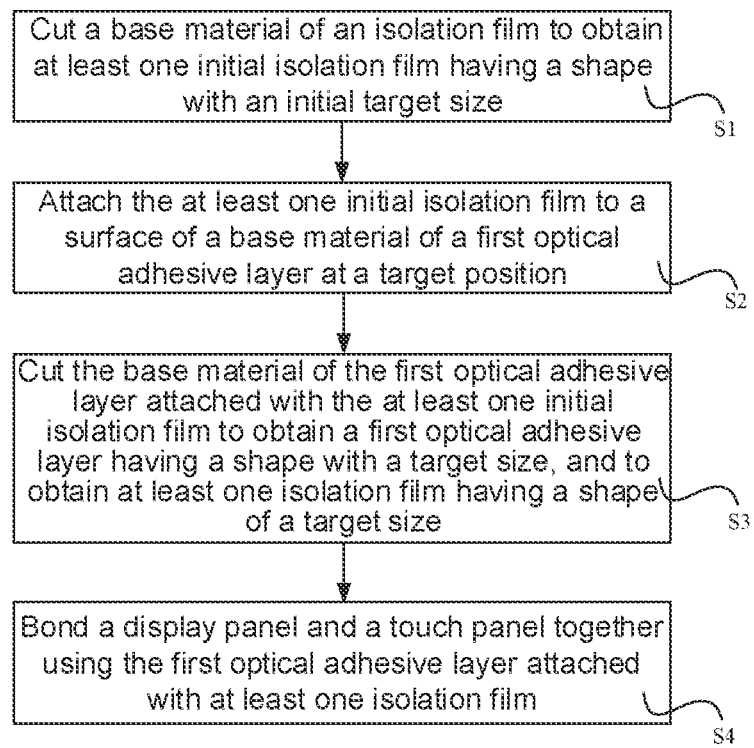
FIG. 22 is a flow diagram of an assembly method for a display module, in accordance with some embodiments.

Some embodiments of the present disclosure further provide an assembly method for a display module. As shown in FIGS. 2 and 22, the assembly method includes the following steps.

In S1, a base material of an isolation film is cut to obtain at least one initial isolation film having a shape with an initial target size.

A die-cutting process is used to cut the base material of the isolation film, so as to obtain the initial isolation film. The size of the initial isolation film is greater than that of the final isolation film shown in FIGS. 9 to 11. In this step, only a substantial shape of the initial isolation film needs to be cut out.

In S2, the at least one initial isolation film is attached to a surface of a base material of a first optical adhesive layer at a target position.

For example, two initial isolation films are attached to the surface of the base material of the first optical adhesive layer at target positions respectively, and the target positions may be positions where a distance between the two initial isolation films is greater than a dimension of a second peripheral region BB2 of a display panel in a display module to be formed in the first direction X1.

In S3, the base material of the first optical adhesive layer attached with the at least one initial isolation film is cut to obtain a first optical adhesive layer having a shape with a target size, and to obtain at least one isolation film having a shape with a target size.

A die-cutting process is used to cut the base material of the first optical adhesive layer attached with the at least one initial isolation film, so as to obtain the first optical adhesive layer having the shape with the target size. The outer contour of the first optical adhesive layer is an outer contour having the target shape. In addition, for a position to which the at least one initial isolation film is attached of the base material of the first optical adhesive layer, the die-cutting process is used to cut the base material of the first optical adhesive layer and the at least one initial isolation film together. For example, the first optical adhesive layer having the shape with the target size obtained by cutting is characterized in that the first optical adhesive layer has at least one lug on a side edge (e.g., the first optical adhesive layer has two lugs), and the lug has the target size. In the at least one isolation film having the shape with the target size obtained by cutting, each isolation film is attached to the position of a lug, and an outer edge of the isolation film is flush or substantially flush with the outer edge of the lug.

For example, the target size of the first optical adhesive layer and the target size of the isolation film satisfy the following conditions: a ratio of a dimension $d_4$ of the isolation film 4 in the first direction X1 to a dimension $d_5$ of the lug 21 in the first direction X1 is in a range of 0.5 to 1, inclusive. The first direction X1 is parallel to an extending direction of a side edge of the first optical adhesive layer 2 where the lug 21 is located. In some embodiments, the dimension $d_4$ of the isolation film 4 in the first direction X1 is in a range of 2 mm to 10 mm, inclusive, and a dimension $d_6$ of the isolation film 4 in the second direction is in a range of 0.5 mm to 1 mm, inclusive.

In S4, a display panel and a touch panel are bonded together using the first optical adhesive layer attached with at least one isolation film.

As shown in FIGS. 1B to 3, the display panel 1 includes a display region AA and a peripheral region BB, and the peripheral region BB is provided with at least one alignment mark 11 therein. The touch panel 3 includes a plurality of peripheral signal lines 31, An orthographic projection of the plurality of peripheral signal lines 31 on the plane where the display panel is located at least partially overlaps with an orthographic projection of the at least one alignment mark on the plane where the display panel is located. An orthographic projection of each isolation film 4 on the plane where the display panel is located covers an alignment mark 11. The isolation film 4 is configured to serve as a background when the alignment mark 11 is identified, so that the identification device can identify the alignment mark from a side of the display panel 1 away from the touch panel.

In some embodiments, the peripheral region BB includes a first peripheral region BB1 surrounding the display region AA, and a second peripheral region BB2 located on a side of the first peripheral region BB1 away from the display region. The at least one alignment mark 11 includes first alignment mark(s) 11a disposed in the first peripheral region BB1. The orthographic projection of the plurality of peripheral signal lines 31 on the plane where the display panel 1 is located at least partially overlaps with an orthographic projection of the first alignment mark 11a on the plane where the display panel 1 is located. The orthographic projection of each isolation film 4 on the plane where the display panel 1 is located covers a first alignment mark 11a.

The above assembly method can make the display panel and the touch panel attached together, and make the isolation film attach to the target position. The position of the at least one isolation film is in one-to-one correspondence with the position of the at least one alignment mark (the first alignment mark 11a). As a result, the at least one isolation film 4 isolates the at least one alignment mark 11 from the peripheral signal lines 31. When the identification device 20 identifies the alignment mark 11, the isolation film 4 can serve as the background, so that the identification device 20 can identify the alignment mark 11. Thus, it may be solved that the first alignment mark 11a cannot be accurately identified due to a fact that the orthographic projection of the plurality of peripheral signal lines 31 on the plane where the display panel 1 is located at least partially overlaps with the orthographic projection of the first alignment mark 11a on the plane where the display panel 1 is located.

In addition, compared with the existing assembly method for the display module, the above assembly method only adds steps of cutting the isolation film and attaching the isolation film. On a premise of not affecting the existing manufacturing process (i.e., the assembly method) of the display module, the identification device can accurately identify the alignment mark in the display panel, so that the display panel is bent at the position marked by the alignment mark. As a result, the quality of the display module may be improved.

In some embodiments, the assembly method for the display module further includes the following steps.

In S1', a base material of a second optical adhesive layer is cut to obtain a second optical adhesive layer having a shape of a target size. S1 and S1' may be performed sequentially or simultaneously.

In S5, a polarizer is attached to a side of the touch panel away from the display panel.

In S6, a second optical adhesive layer is used to make the touch panel adhere to a cover plate.

In addition, the assembly method for the display module further includes bending the second peripheral region of the display panel to the side of the non-display surface, and bending the flexible printed circuit coupled to the touch panel to the side of the non-display surface, so as to obtain the display module shown in FIG. 20.

Through the above steps, the assembly of the display module is realized.

It will be noted that, as shown in FIGS. 1B, 2, 5, and 16, the display panel and the touch panel each have a frame (called a dummy structure) around themselves. The frames are used to assist the manufacturing and assembly of the display module. After the display panel and the touch panel are manufactured, the frames will be removed. As shown in FIG. 20, the frames are not included in the final display module.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display module, comprising:
    a display panel, the display panel having a display region and a peripheral region, and including at least one alignment mark in the peripheral region;
    a first optical adhesive layer disposed on a side of a display surface of the display panel;
    a touch panel disposed on a side of the first optical adhesive layer facing away from the display panel, wherein the touch panel includes a plurality of peripheral signal lines; and an orthographic projection of the plurality of peripheral signal lines on a plane where the display panel is located at least partially overlaps with an orthographic projection of the at least one alignment mark on the plane where the display panel is located; and
    at least one isolation film disposed between the display panel and the touch panel, wherein an orthographic projection of each isolation film on the plane where the display panel is located covers the at least one alignment mark; and the isolation film is configured to block light directed to the plurality of peripheral signal lines from a side of the display panel away from the touch panel.

2. The display module according to claim 1, wherein the peripheral region includes a first peripheral region surrounding the display region, and a second peripheral region located on a side of the first peripheral region away from the display region;
    the at least one alignment mark includes at least one first alignment mark disposed in the first peripheral region;
    the orthographic projection of the plurality of peripheral signal lines on the plane where the display panel is located at least partially overlaps with an orthographic projection of the at least one first alignment mark on the plane where the display panel is located; and
    the orthographic projection of each isolation film on the plane where the display panel is located covers the at least one first salignment mark.

3. The display module according to claim 2, wherein in a plurality of side edges of the first optical adhesive layer, a side edge corresponding to the second peripheral region has at least one lug; an orthographic projection of each first alignment mark on the first optical adhesive layer is within a range of a lug; and
    each isolation film is disposed on a lug.

4. The display module according to claim 3, wherein a ratio of a dimension of the isolation film in a first direction to a dimension of the corresponding lug in the first direction is in a range of 0.5 to 1, inclusive;
    the first direction is parallel to an extending direction of the side edge of the first optical adhesive layer corresponding to the second peripheral region.

5. The display module according to claim 4, wherein the dimension of the isolation film in the first direction is in a range of 1.5 mm to 10 mm, inclusive.

6. The display module according to claim 3, wherein the isolation film has a first edge and a second edge that are in parallel and arranged in a second direction; in the second direction, the first edge is closer to the display region than the second edge;
    the second direction is a direction perpendicular to an extending direction of the side edge of the first optical adhesive layer corresponding to the second peripheral region;
    in the second direction, the first edge of the isolation film is located between an edge of the at least one first alignment mark proximate to the display region and an edge of the plurality of peripheral signal lines proximate to the display region; or the first edge of the isolation film substantially coincides with the edge of the plurality of peripheral signal lines proximate to the display region; and
    the second edge of the isolation film is substantially flush with an edge of the corresponding lug away from the display region.

7. The display module according to claim 6, wherein a dimension of the isolation film in the second direction is in a range of 0.5 mm to 1 mm, inclusive.

8. The display module according to claim 3, wherein two first alignment marks are disposed in the first peripheral region, the two first alignment marks are respectively located on two sides of the second peripheral region, and the two first alignment marks are configured to mark a bending position of the second peripheral region;
    the first optical adhesive layer has two lugs, and the two lugs are respectively located on the two sides of the second peripheral region; and
    the at least one isolation film includes two isolation films, and the two isolation films are respectively located on the two sides of the second peripheral region.

9. The display module according to claim 3, wherein the second peripheral region of the display panel is capable of being bent to a side of a non-display surface of the display module; the display panel includes sub-pixels disposed in the display region and a plurality of fan-out wires disposed in the second peripheral region, and the plurality of fan-out wires are electrically connected to the sub-pixels in the display region; and
    the display module further comprises a display driver chip electrically connected to the plurality of fan-out wires, and the display driver chip is capable of being disposed on the side of the non-display surface of the display module along with bending of the second peripheral region.

10. The display module according to claim 9, further comprising:
    a flexible printed circuit disposed on a side of the touch panel, wherein the flexible printed circuit and the second peripheral region are located on a same side of the display module, and the flexible printed circuit is capable of being bent to the side of the non-display surface of the display module; and a touch driver chip disposed on the flexible printed circuit; the touch driver chip being electrically connected to the plurality of peripheral signal lines of the touch panel through the flexible printed circuit.

11. The display module according to claim 2, wherein a material of the at least one first alignment mark is metal;
the display panel includes a base substrate, and at least one metal conductive layer disposed on a side of the base substrate; and the at least one first alignment mark is disposed in a metal conductive layer in the at least one metal conductive layer.

12. The display module according to claim 1, wherein the at least one isolation film is disposed on a side of the first optical adhesive layer proximate to the display panel; or
the at least one isolation film is disposed on a side of the first optical adhesive layer proximate to the touch panel.

13. The display module according to claim 12, wherein a surface of the isolation film away from the first optical adhesive layer has adhesion; and
a surface of the isolation film proximate to the first optical adhesive layer has no adhesion, and the isolation film is bonded to the first optical adhesive layer through adhesion of the first optical adhesive layer.

14. The display module according to claim 12, wherein the first optical adhesive layer includes a first surface on which the isolation film is disposed, and a second surface opposite to the first surface; and
a portion of the first surface not covered by the isolation film is substantially flush with a surface of the isolation film away from the second surface.

15. The display module according to claim 14, wherein a ratio of a thickness of a portion of the first optical adhesive layer not covered by the isolation film to a thickness of the isolation film is in a range of 10 to 30, inclusive.

16. The display module according to claim 15, wherein the thickness of the portion of the first optical adhesive layer not covered by the isolation film is in a range of 100 µm to 150 µm, inclusive; and the thickness of the isolation film is in a range of 5 µm to 10 µm, inclusive.

17. The display module according to claim 1, wherein the isolation film is a light-shielding tape.

18. The display module according to claim 1, further comprising:
a circular polarizer disposed on a side of the touch panel away from the display panel;
a second optical adhesive layer disposed on a side of the circular polarizer away from the display panel; and
a cover plate disposed on a side of the second optical adhesive layer away from the touch panel.

19. A display apparatus comprising the display module according to claim 1.

20. An assembly method for a display module, comprising:
cutting a base material of an isolation film to obtain at least one initial isolation film having a shape with an initial target size;
attaching the at least one initial isolation film to a surface of a base material of a first optical adhesive layer at a target position;
cutting the base material of the first optical adhesive layer attached with the at least one initial isolation film to obtain a first optical adhesive layer having a shape with a target size, and to obtain at least one isolation film having another shape of another target size; and
using the first optical adhesive layer attached with the at least one isolation film to make a display panel adhere to a touch panel, wherein
the display panel has a display region and a peripheral region, and includes at least one alignment mark in the peripheral region; the touch panel includes a plurality of peripheral signal lines;
an orthographic projection of the plurality of peripheral signal lines on a plane where the display panel is located at least partially overlaps with an orthographic projection of the at least one alignment mark on the plane where the display panel is located; and
an orthographic projection of each isolation film on the plane where the display panel is located covers the at least one alignment mark.

* * * * *

UNITED STATES PATENT AND TRADEMARK OFFICE
CERTIFICATE OF CORRECTION

| | | |
|---|---|---|
| PATENT NO. | : 11,829,009 B2 | Page 1 of 1 |
| APPLICATION NO. | : 18/014230 | |
| DATED | : November 28, 2023 | |
| INVENTOR(S) | : Haotian Yang et al. | |

It is certified that error appears in the above-identified patent and that said Letters Patent is hereby corrected as shown below:

In the Claims

Column 19 (Claim 2), Line 60 reads "one first salignment mark" should read "one first alignment mark"

Signed and Sealed this
Eighth Day of October, 2024

Katherine Kelly Vidal
*Director of the United States Patent and Trademark Office*